United States Patent [19]

Onodera et al.

[11] 4,401,902
[45] Aug. 30, 1983

[54] HIGH FREQUENCY SWITCHING CIRCUIT

[75] Inventors: Toshihiro Onodera, Kunitachi; Youichi Masuda, Yokohama; Akira Nakajima, Yokosuka; Yoshio Takamura; Seiji Kajiwara, both of Yokohama; Shoichi Higo, Zama, all of Japan

[73] Assignee: Tokyo Shibaura Denki Kabushiki Kaisha, Kawasaki, Japan

[21] Appl. No.: 349,091

[22] Filed: Feb. 16, 1982

[30] Foreign Application Priority Data

Feb. 17, 1981 [JP] Japan ................................. 56-21936

[51] Int. Cl.$^3$ ...................... H03K 3/49; H03K 17/60; H03K 19/16
[52] U.S. Cl. .................................. 307/415; 307/253; 307/314
[58] Field of Search ............... 307/415, 414, 419, 253, 307/268, 314; 328/35, 36, 65

[56] References Cited

U.S. PATENT DOCUMENTS 2,719,237 10/1951 Krienen ............................... 307/419
2,787,755 4/1957 Smith .................................. 307/419
3,612,895 8/1969 Niedra ................................ 307/419

Primary Examiner—Michael L. Gellner
Assistant Examiner—Todd E. DeBoer
Attorney, Agent, or Firm—Cushman, Darby & Cushman

[57] ABSTRACT

A switching element is connected between a power supply and the primary winding of a transformer, and it is on-off controlled with a predetermined cycle and with a predetermined conducting period. The secondary winding of the transformer is connected to a parallel circuit of a filtering capacitor and a load via a rectifier diode and a choke coil. A closed circuit, to which the reflux current of the choke coil flows through the parallel circuit of the filtering capacitor and load, is formed by a reflux diode.

4 Claims, 7 Drawing Figures

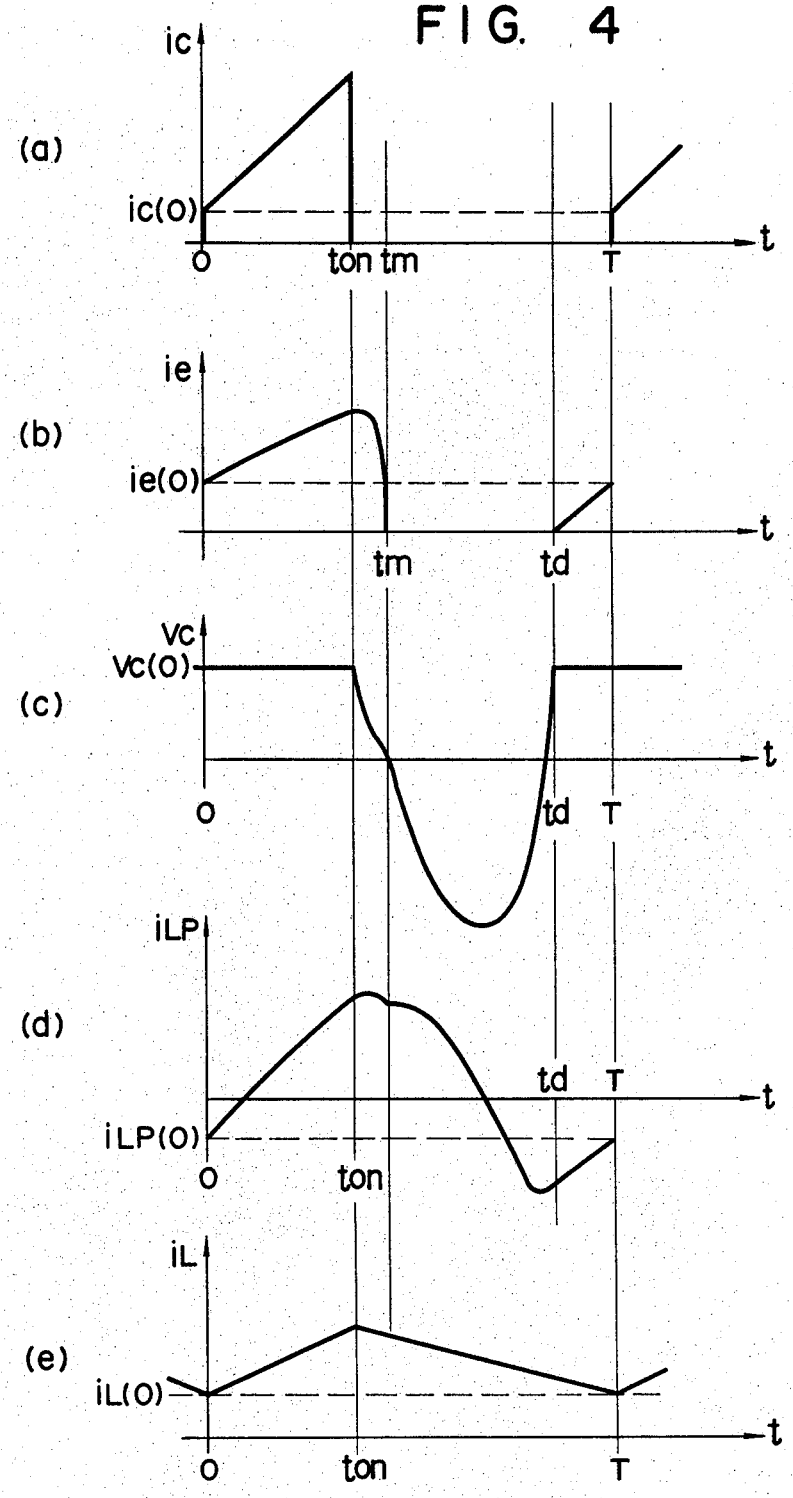

HIGH FREQUENCY SWITCHING CIRCUIT

BACKGROUND OF THE INVENTION

This invention relates to high frequency switching circuits and, more particularly, to a high frequency switching circuit of voltage resonance type using a single-ended switching circuit.

As the power sources for peripheral units of a computer system and conventional communication devices, low-voltage, high-current stabilized power sources have been used. These power sources are, in many cases, switching power sources, which have the advantages of small size, light weight and high efficiency. Among these switching power sources, those which make use of voltage or current resonance waves have sufficient switching efficiency of main switching element (such as a transisitor, a thyristor, a MOSFET, etc.) and can operate with low noise. On the demerit side, however, a voltage resonance type switching circuit which is based on a single-ended switching circuit is prone to intermittent current through a filtering capacitor. This intermittent current induces noise voltage in the equivalent resistance or inductance of the filtering capacitor and also increases power loss in the filtering capacitor. Further, where high power is supplied to a load by intermittent current, the peak value of current flowing thhrough a rectifier diode amounts to several times the average current to increase power loss in the rectifier diode.

SUMMARY OF THE INVENTION

An object of the invention is to provide a voltage resonance type switching circuit, which can suppress power loss and noise.

According to the invention, there is provided a voltage resonance type high frequency switching circuit, in which the leakage inductance that is present between the primary and secondary windings of a transformer in a single-ended switching circuit is positively utilized, and a current filtering choke coil and a diode for regenerating the choke current flowing through the choke coil are provided on the secondary side of the transformer, whereby a voltage resonance wave in a switching element provided on the primary side of the transformer can be maintained.

BRIEF DESCRIPTION OF THE DRAWINGS

FIG. 3 is a circuit diagram showing an equivalent curcuit to the high frequency switching circuit of FIG. 1 when the switching element is turned on;

FIG. 4 is a timing chart illustrating the operation of the high frequency switching circuit;

DETAILED DESCRIPTION OF THE PREFERRED EMBODIMENT

Figure 1:
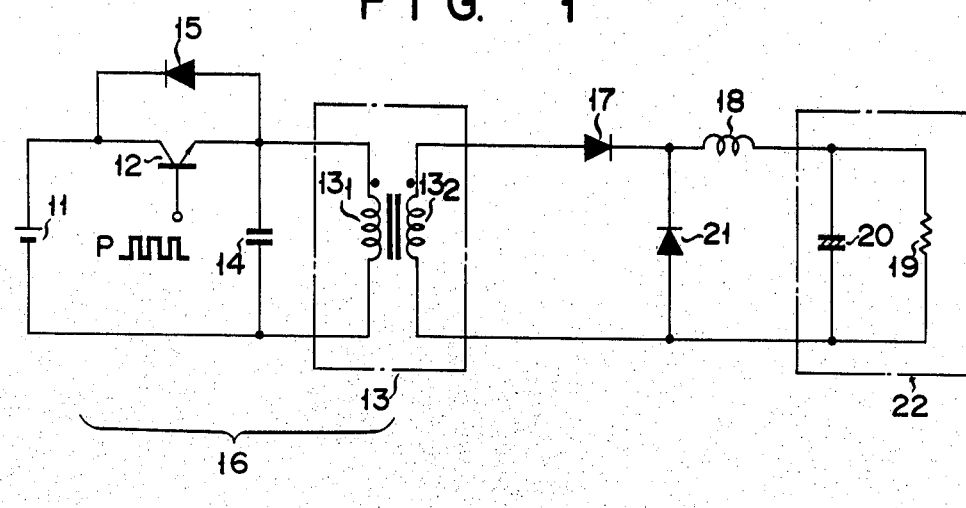
FIG. 1 is a circuit diagram showing one embodiment of the voltage resonance type high frequency switching circuit according to the invention.
Figure 2:
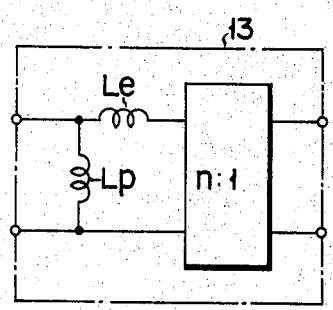
FIG. 2 is a circuit diagram showing an equivalent circuit to the transformer in the high frequency switching circuit shown in FIG. 1.

Referring to FIG. 1, a power supply 11 is connected at its positive terminal through the collector-emitter path of a transistor 12, which serves as a switching element, to one end of the primary winding $13_1$ of a transformer 13, while its negative terminal is connected to the other end of the primary winding $13_1$. A resonance capacitor 14 is connected in parallel with the primary winding $13_1$, and a damper diode 15 is connected between the collector and emitter of the transistor 12 in the opposite polarity thereto. The transistor 12, transformer 13, resonance capacitor 14 and damper diode 15 constitute a single-ended switching circuit 16. The secondary winding $13_2$ of the transformer 13 is connected at one end to the anode of a rectifier diode 17, the cathode of which is connected through a choke coil 18 to one end of a load circuit 22. The load circuit 22 includes a load 19 and a filtering capacitor 20 connected in parallel with the load 19. The other end of the load circuit 22 is connected to the other end of the secondary winding $13_2$. To the juncture between the diode 17 and choke coil 18 is connected the cathode of a unidirectional circuit element e.g. diode 21, the anode of which is connected to the other end of the load circuit 22. The diode 21 serves as a reflux diode to allow the flow of inertial current through the choke coil 18. FIG. 2 shows an equivalent circuit of the transformer 13, in which the turns ratio between the primary and secondary windings $13_1$ and $13_2$ is n:1, the excitation inductance is Lp and the leakage inductance looked from the primary side is Le.

The operation of the high frequency switching circuit having the above construction will now be described. In the primary side circuit of the transformer 13, the switching cycle and conducting period (on-period) of the transistor 12, capacitance of the resonance capacitor 14 and excitation inductance of the transformer 13 are set to values related to one another such that a sinusoidal arcular voltage is impressed across the transistor 12. It is assumed for the simplicity of description that the diodes 15, 17 and 21 and transistor 12 are ideal switches. Also, when the circuit of FIG. 1 is in a steady state, a voltage Vout is present across the filtering capacitor 20, and thus the load circuit 22 can be regarded to be equivalent to a battery. Further, if it is assumed that the turns ratio of the transformer 13 is 1:1, the transformer 13 need not be considered. When the steady state of the circuit of FIG. 1 has been attained, initial currents $i_c(0)$, $i_{LP}(0)$, $i_e(0)$ and $i_L(0)$ and initial voltage Vc(0) are present in the collector of the transistor 12, excitation inductance of the transformer 13, leakage inductance Le, choke coil 18 and resonance capacitor 14 respectively at the instant of start of one cycle period of a drive pulse train P applied to the base of the transistor 12 due to accumulation in the past transient period.

Figure 3:
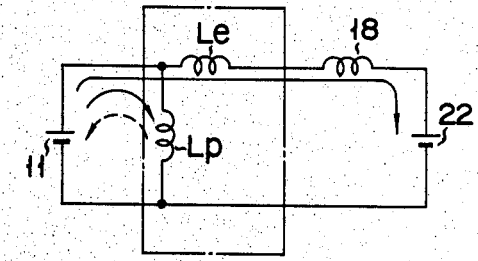

When the transistor 12 is turned on under the conditions mentioned above, the power supply 11 and transformer 13 are in connection to each other for the "on" period of the transistor between instants t0 and $t_{on}$. At this time, the circuit FIG. 1 can be thought as a circuit shown in FIG. 3 because the initial voltage Vc(0)=Ein is present across the capacitor 14. In the circuit of FIG. 3, the current $i_{LP}$ in the excitation inductance Lp increases linearly from the initial current $i_{LP}(0)$ as shown in (d) in FIG. 4 from the instant t0 of strt of the "on" period till the instant $t_{on}$. Also, the linearly increasing current increasing from the initial value $i_e(0)$ according to the difference (Ein−Vout) between the input and output voltages as shown in (b) and (e) in FIG. 4, flows through the leakage inductance Le of the transformer 13 and choke coil 18.

Figure 5:
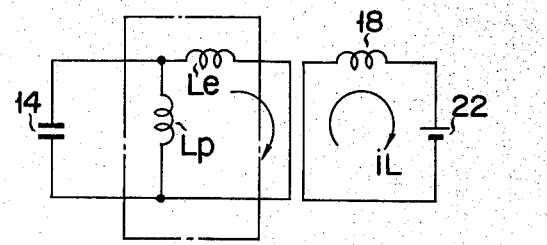
FIG. 5 is a circuit diagram showing an equivalent circuit to the high frequency switching circuit when the switching element is turned off.
Figure 6:
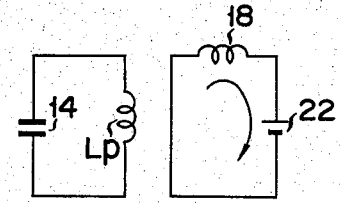
FIG. 6 is a circuit diagram showing an equivalent circuit to the high frequency switching circuit when the current stored in the leakage inductance becomes zero.

When the transistor 12 is turned off at the instant $t_{on}$, the power supply 11 is disconnected from the circuit of the transistor 13 and capacitor 14, and a resonance circuit is formed by the primary winding $13_l$ of the transformer 13 and capacitor 14. At this time, the current that has been flowing through the choke coil 18 turns to flow into the circuit of the lowest transient impedance, i.e., the load circuit 22, due to the inertia. FIG. 5 shows the equivalent circuit of the circuit of FIG. 1 in this state. Here, on the primary side of the transformer 13 a closed circuit is formed by a parallel circuit of the resonant capacitor 14, the excitation inductance Lp of the transformer 13 and the leakage inductance Le thereof, and also on the secondary side a closed circuit is formed by the choke coil 18 and load circuit 22. In the circuit of FIG. 5, the current $i_e$ flowing through the choke coil 18 is sharply reduced during a period from the instant $t_{on}$ till an instant $t_m$ as shown in (b) in FIG. 4. In the primary side circuit, current stored in the excitation inductance Lp and leakage inductance Le of the transformer 13 flows into the resonance capacitor 14, and this current reduces by drawing a resonance waveform arc as shown in (c) in FIG. 4. At the same time, the current $i_e$ stored in the leakage inductance Le reduced by drawing the same resonance waveform arc and becomes zero at the instant $t_m$. After the instant $t_m$, the current $i_e$ flows in the negative direction. However, the diode 17 which is provided in the switching circuit functions to block the negative portion of the current $i_e$, i.e., prevents the current $i_e$ from flowing into the leakage inductance Le. This means that the leakage inductance Le is disconnected from the left side closed circuit in FIG. 5. FIG. 6 shows the equivalent circuit to the high frequency switching circuit in this state. In the circuit of FIG. 6, the terminal voltage Vc across the capacitor 14 changes according to the resonance produced by the capacitor 14 and excitation inductance Lp, going to a negative maximum and then back to the voltage Ein of the power supply 11 as shown in (c) in FIG. 4. Meanwhile, the current $i_L$ through the choke coil 18 is reduced with a constant grade as shown in (e) in FIG. 4. In the period from instant $t_d$ till instant T, when the terminal voltage Vc across the capacitor 14 becomes higher than the supply voltage Ein, the diode 15 is rendered conductive, causing the residual current in the excitation inductance Lp to flow in the direction of broken arrow in FIG. 3. The current $i_{LP}$ at this time is shown in (d) in FIG. 4.

The sequence of operation during the period from the instant t0 till the instant T as described above is the operation for one cycle period of the switching pulse train P. During this cycle period, the final currents $i_c(T)$, $i_e(T)$, $i_{LP}(T)$ and $i_L(T)$ and final voltage Vc(T) become equal to the respective initial currents $i_c(0)$, $i_e(0)$, $i_{LP}(0)$ and $i_L(0)$ and initial voltage Vc(0).

With the voltage resonance type high frequency switching circuit described above, in which the current $i_L$ through the load circuit 22 is a pulsating current and is not interrupted at all, there is no need of providing a number of smoothing capacitors even under low voltage, high current load condition. In addition, since it is necessary to cause only slight ripple component of the pulsating current to flow through the filtering capacitor, substantially no noise is produced by the equivalent inductance or resistance of the smoothing capacitor. Further, since the terminal voltage across the transistor 12 changes in a fashion to draw a sinusoidal wave arc, substantially no power is lost at the time of turning on and off the switching element.

Figure 7:
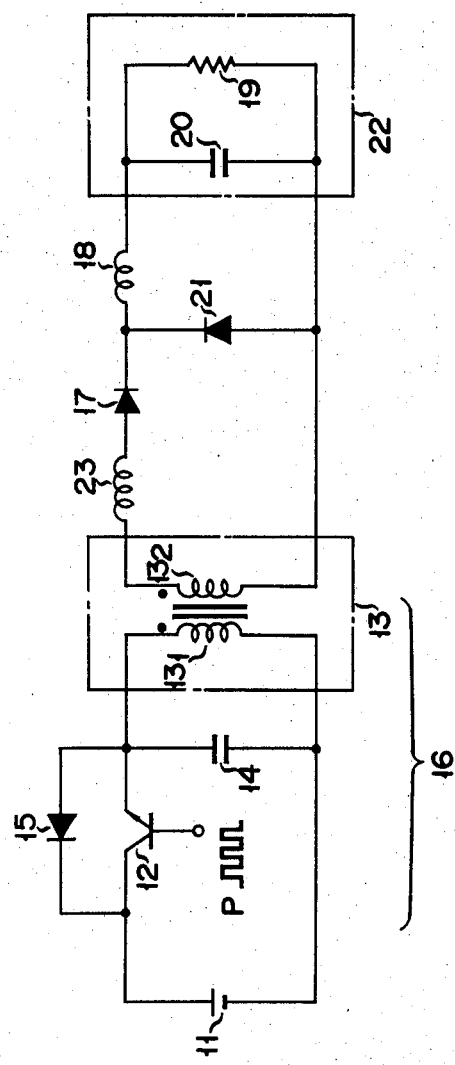
FIG. 7 is a circuit diagram showing a different embodiment of the high frequency switching circuit according to the invention.

While in the above embodiment the leakage inductance of the transformer has been effectively utilized for the switching operation, substantially the same switching operation as that of the circuit of FIG. 1 and hence the same effects may be obtained as well in case where an additional inductance 23 is inserted between the secondary winding of the transformer 13 and the rectifier diode, as shown in FIG. 7. Further, while in the above embodiment the switching element has been a bipolar transistor, it is also possible to use a thyristor or a MOSFET.

What we claim is:

1. A single-ended high frequency switching circuit comprising:
   a single-ended switching circut including a transformer having a primary winding and a secondary winding, a switching element circuit connected between the primary winding of said transformer and a power supply and on-off operated with a predetermined cycle and a predetermined conduction period and a resonance capacitor connected in parallel with said primary winding;
   rectifying means connected to the secondary winding of said transformer;
   a filtering circuit including a filtering capacitor connected in parallel with a load;
   a choke coil connected between said filtering circuit and the output end of said rectifying means; and
   an unidirectional circuit element connected in parallel with said filtering circuit and said load via said choke coil and forming a closed circuit passing the current through said choke coil.

2. The single-ended high frequency switching circuit according to claim 1, wherein said switching element circuit includes a bipolar transistor and a diode connected between the collector and emitter of said bipolar transistor and in the opposite polarity thereto.

3. The single-ended high frequency switching circuit according to claim 1, wherein said unidirectional circuit element is a diode.

4. The single-ended high frequency switching circuit according to claim 1, 2 or 3, which further comprises an inductor connected between the secondary winding of said transformer and said rectifying means.

* * * * *